United States Patent [19]
Gautron

[11] Patent Number: 4,652,166
[45] Date of Patent: Mar. 24, 1987

[54] COMPACT, FLEXIBLE CABLE CONNECTION

[75] Inventor: Maurice Gautron, Les Essarts, France

[73] Assignee: Kley France, France

[21] Appl. No.: 798,340

[22] Filed: Nov. 15, 1985

[30] Foreign Application Priority Data

Dec. 6, 1984 [FR] France .................. 84 18600

[51] Int. Cl.$^4$ .................................. B25G 3/00
[52] U.S. Cl. ................................. 403/41; 403/56; 403/299
[58] Field of Search .............. 403/56, 41, 299, 284

[56] References Cited

U.S. PATENT DOCUMENTS

| | | | |
|---|---|---|---|
| 342,850 | 6/1886 | Smith | 403/56 |
| 836,882 | 11/1906 | Hoffman | 403/41 |
| 1,984,026 | 12/1934 | Little | 403/299 X |
| 2,318,119 | 5/1943 | Westhaver | 403/78 X |

FOREIGN PATENT DOCUMENTS 794363 12/1935 France .................. 403/56

Primary Examiner—Andrew V. Kundrat

[57] ABSTRACT

A device is provided for connecting two cables together, comprising a short linking rod having a partially spherical member at each end thereof, a first pair of sockets, each socket of said first pair receiving a respective one of said spherical members and forming a ball and socket joint therewith, and a second pair of sockets, each socket of said second pair being detachably connected to a respective one of the sockets of said first pair and having an axial passage receiving one end portion of one of the two cables to be connected, wherein each socket of the second pair has a generally cylindrical outer shape and its axial passage is also cylindrical with a diameter corresponding to that of the end portion of the cable received therein, and each socket of the second pair is secured to the end portion of the corresponding cable by constricting said socket of said second pair through a constricting die.

8 Claims, 3 Drawing Figures

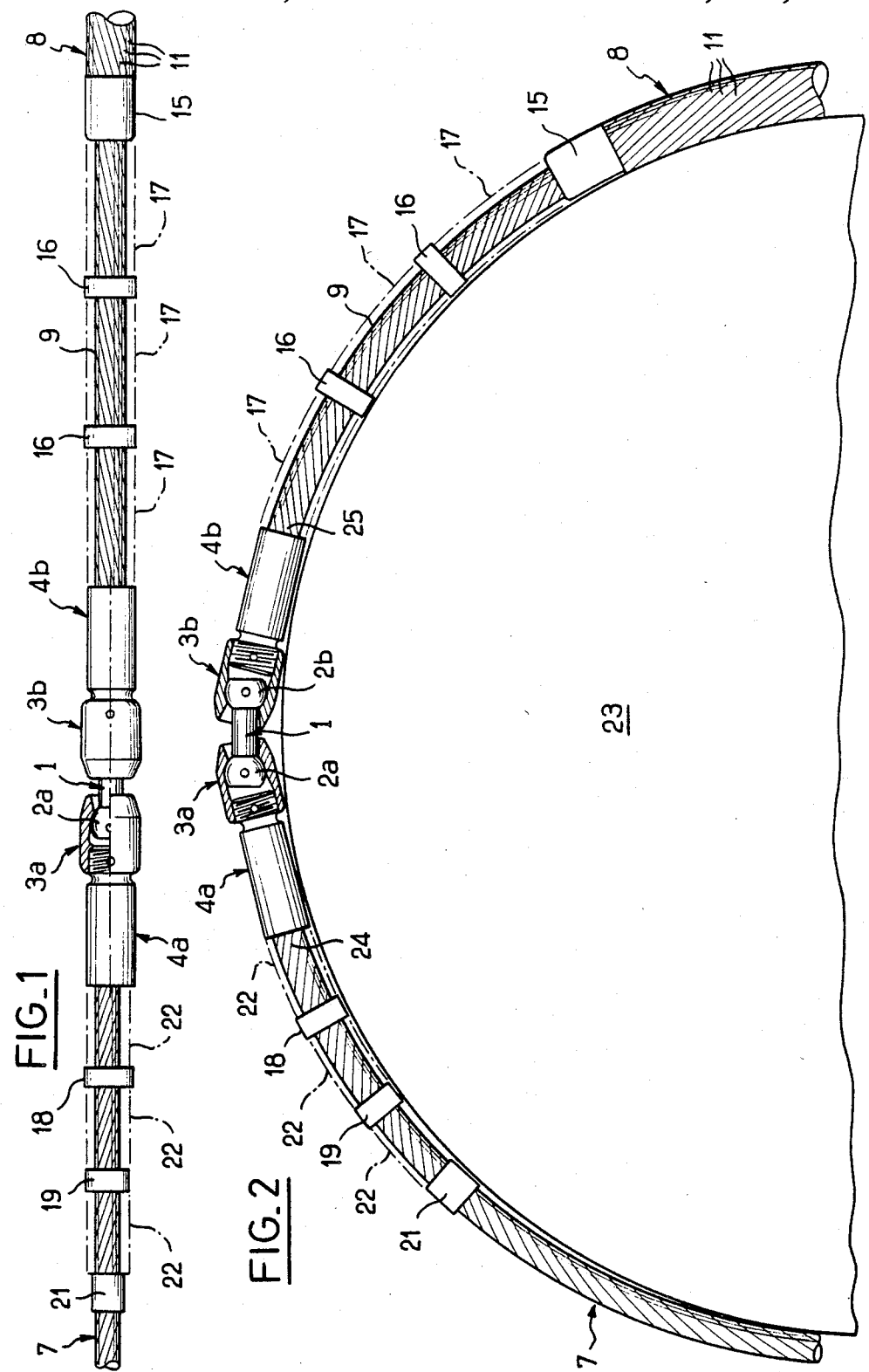

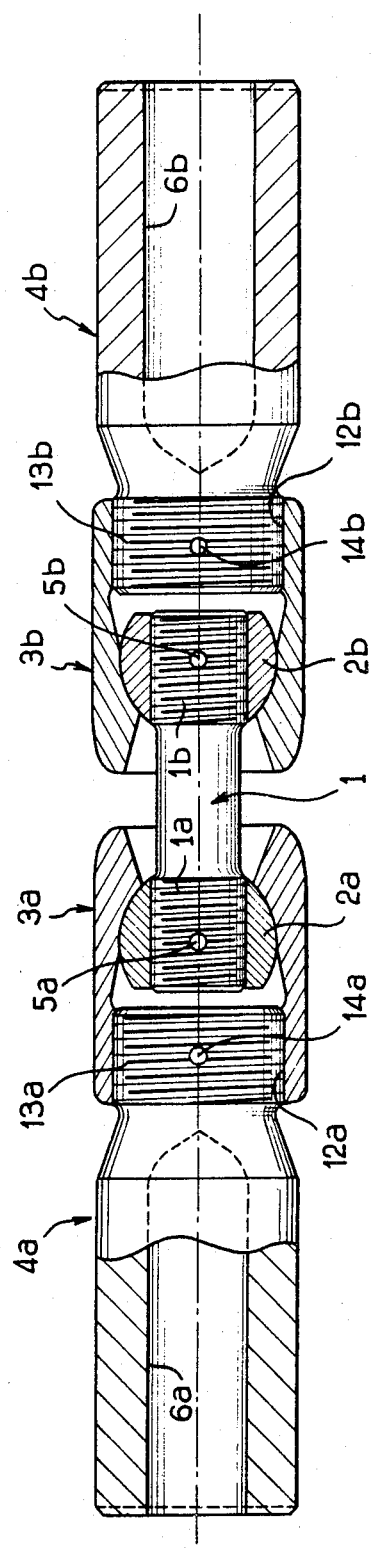
FIG_3

COMPACT, FLEXIBLE CABLE CONNECTION

BACKGROUND OF THE INVENTION

1. Field of the Invention

The present invention relates to a device for connecting two cables, together, the two cables being of the same or different diameters.

In some work sites, for example on sea drilling platforms anchored by cables, there is sometimes need to join two cables together, for example an anchorage cable to a cable of smaller diameter for handling the anchorage cable, and the connection of the two cables must on the one hand be capable of withstanding heavy tractive forces exerted on the cables and, on the other, sufficiently compact and flexible to be able to pass over one or more pulleys.

2. Description of the Prior Art

Up to now, for joining two cables together, it has been current practice to splice them by interlacing their strands and fixing the strands together by welding or brazing. However, with this method of joining, it is difficult to check the strength of the joint and in general a breaking strength can only be guaranteed which is about half that of the smallest diameter cable. Furthermore, such a method of joining presents a risk of breakage of the welds or at least weakening thereof when passing over a pulley. In addition, the splice thus obtained has only relatively small flexibility and a relatively large diameter, which hinders the passage of the joint over a pulley or necessitates the provision of a pulley having both a larger diameter and a groove substantially wider than the one which would be necessary for receiving the largest diameter cable.

Flexible connections for cables are known by German Pats. Nos. 1 900 909 and 1 169 731. In these known cable connecting devices, the end of each cable is provided with a pear shaped ferrule. Each ferrule comprises a first socket and a second socket detachably fixed to the first socket by a bayonet joint (German Pat. No. 1 900 909) or by a threaded coupling (German Pat. NO. 1 169 731). Each first socket forms a ball and socket joint with one of two partially spherical members fixed to the ends of a short linking rod, respectively. Each second socket has a funnel shape or the shape of a hollow cone with an axial passage receiving an end portion of one of the two cables to be connected, the wires of which are spread and embedded in a mass of metal cast in the passage of said second socket to secure said end portion of the cables to the corresponding second socket (see page 2, lines 27 to 29 and page 3, lines 12 to 14 in German Pat. No. 1 900 909 and column 4, lines 19 to 23 in German Pat. No. 1 169 731). Thus, said first and second sockets have an outer diameter which is much larger than that of the cables (about 4½ times larger in the examples shown in these German patents).

U.K. Pat. No. 363 422 shows a device for connecting a wire rope to a chain. In this known device, the wire rope is secured to a socket by driving in a taper pin and by soldering (page 2, lines 65 to 67). The socket has a rounded end forming a ball and socket joint with a correspondingy rounded end of a thimble to which the chain is attached. Here again, the transversal dimension of the thimble, hence the largest transversal dimension of the connection is much larger than the outer diameter of the wire rope (more than four times larger in the example shown in this U.K. patent).

SUMMARY OF THE INVENTION

The object of the present invention is therefore to provide a joining device which is both compact and which has good flexibility. Another object of the invention is to provide a joining device which, in the case where the cables have different diameters, has a breaking strength equal to or greater than that of the smallest diameter cable and a diameter of the same order of size as that of the largest diameter cable.

To this end, the invention provides a device for connecting two cables, comprising a short linking rod having a partially spherical member at each end thereof, a first pair of sockets, each socket of said first pair receiving a respective one of said spherical members and forming a ball and socket joint therewith, and a second pair of sockets, each socket of said second pair being detachably connected to a respective one of the sockets of said first pair and having an axial passage receiving one end portion of one of the two cables to be connected, wherein each socket of the second pair has a generally cylindrical outer shape and its axial passage is also cylindrical with a diameter corresponding to that of the end portion of the cable received therein, and each socket of the second pair is secure to the end portion of the corresponding cable by constricting said socket of said second pair through a constricting die.

Other features and advantages of the present invention will be more clearly understood from the following description of one embodiment of the connecting device of the invention with reference to the accompanying drawings in which:

FIG. 1 is an elevational view showing two cables of different diameters connected together by the connection device of the present invention.

FIG. 2 is an elevational view showing the connection device and the two cables about a pulley.

FIG. 3 is an axial sectional view on a larger scale showing the main part of the connection device of FIGS. 1 and 2.

DESCRIPTION OF THE PREFERRED EMBODIMENT

As can be best seen in FIG. 3, the connection device of the present invention comprises essentially a cylindrical rod 1, the ends of which are provided with partially spherical members 2a and 2b which are respectively rotatably mounted in ball sockets 3a and 3b, which are themselves respectively detachably fixed to cylindrical sockets 4a and 4b.

Preferably, each of the two ends of the rod 1 is threaded as shown at 1a and 1b and each of the two partially spherical members 2a and 2b is provided with a tapped bore and is screwed on the threaded portion 1a or 1b of rod 1. After being screwed on the corresponding threaded portion 1a or 1b, each of the two members 2a and 2b is fixed in position by means of a pin 5a or 5b passing through aligned bores formed transversally in the threaded portion 1a and in the member 2a or in the threaded portion 1b and in member 2b, respectively.

Each of the two cylindrical sockets 4a and 4b comprises an axial bore 6a or 6b, the diameter of which is chosen to allow engagement therein of one end of one of the two cables 7 and 8 to be connected. In the case where the two cables 7 and 8 have different diameters as shown in Figures 1 and 2, the largest diameter cable having a core 9 and outer strands 11 wound helically about the core, the diameter of bore 6a is chosen so as to correspond to the diameter of cable 7 having the smallest diameter, whereas the diameter of bore 6b is chosen so as to correspond to the diameter of the core 9 of the largest diameter cable 8. In th case, the cylindrical sockets 4a and 4b are fixed, by constricting them through an appropriate constricting die, to one of the ends of cable 7 and to a bared end of the core 9, respectively.

After the cylindrical sockets 4a and 4b have been fixed respectively to cables 7 and 8 in the manner indicated above, the two ball sockets 3a and 3b are fixed respectively to sockets 4a and 4b. To this end, each of the ball sockets 3a and 3b comprises a cylindrical inwardly threaded part 12a or 12b, and each of the two sockets 4a and 4b comprises an externally threaded portion 13a or 13b which is screwed into the threaded cylindrical portion 12a or 12b of the corresponding ball socket 3a or 3b. Each of the two ball sockets 3a and 3b is fixed in position on the corresponding socket 4a or 4b by means of a pin 14a or 14b passing through aligned bores formed transversely in the threaded portion 13a and in the ball socket 3a or in the threaded portion 13b and in the ball socket 3b, respectively.

The two ball sockets 3a and 3b have an outer diameter substantially equal to the outer diameter of the largest diameter cable 8. The two sockets 4a and 4b, after constriction have an outer diameter comprised between the diameter of core 9 and the outer diameter of the largest diameter cable 8.

As shown in FIGS. 1 and 2, in order to bare the core 9 of the largest diameter cable 8, its outer strands 11 have been cut off over a part of their length so that their ends are spaced longitudinally from socket 4b. A ring 15 is crimped to core 9 and to the ends of strands 11 so as to secure them to core 9. After crimping, ring 15 has an outer diameter substantially equal to the outer diameter of cable 8. At least one other ring, for example two rings 16 having an outer diameter substantially equal to the outer diameter of cable 8, are disposed on the core 9 between socket 4b and ring 15. Sleeves 17 (shown with a dash dot line) made from an elastomer material, for example from rubber, having an outer diameter substantially equal to the outer diameter of cable 8, are disposed about core 9 between the two rings 16, between one of the two rings 16 and socket 4b and between the other ring 16 and ring 15.

Several other rings, for example three rings 18, 19 and 21 are also disposed on cable 7 spaced apart from each other and from socket 4a. Rings 18, 19 and 21 have outer diameters which become smaller and smaller the further away from socket 4a, ring 18 having an outer diameter substantially equal to that of socket 4a. Sleeves 22 (shown with a dash dot line) made from an elastomer material, for example rubber, may also be disposed about cable 7 between rings 18, 19 and 21 and between ring 18 and socket 4a. When the two cables 7 and 8 connected by the connection device of the present invention have passed about a pulley 23 as shown in FIG. 2, rings 16, 18, 19 and 21 bear on the periphery of the pulley thus avoiding the application of flexion stresses to cables 7 and 8 in zones 24 and 25 respectively adjacent the sockets 4a and 4b.

As is clear from the foregoing, the connection device of the present invention provides a particularly robust joint, which is capable of being deformed, because of the presence of the two members 2a and 2b, to conform with the curvature of a pulley, and in which the largest elements (the ball sockets 3a and 3b) have a diameter scarcely greater than that of the largest of the two cables. In addition, by giving appropriate dimensions to the different parts forming the device and by using high strength materials, for example treated steels, it is possible to obtain a joint having a well defined and well controlled breaking strength, which is not the case with welded or brazed connections.

It goes without saying that the embodiment which has been described above has been given by way of example which is purely indicative and in no wise limitative, and that numerous modifications may be readily made by a man skilled in the art without departing from the scope and spirit of the present invention.

Moreover, although the connection device has been described above in relation to the connection of two cables of different diameters, it may of course be used for joining two cables of the same diameter. For example, cable 7 could be identical to cable 8. In this case, socket 4a would be fixed to the core of cable 7 and rings 18, 19 and 21 would be replaced by rings similar to rings 15 and 16.

What is claimed is:

1. Device for connecting two cables of different diameters, the largest diameter cable having a core and outer strands strands wound helically about the core, comprising a short linking rod having a partially spherical member at each end thereof, a first pair of sockets, each socket of said first pair receiving a respective one of said spherical members and forming a ball and socket joint therewith, and a second pair of sockets, each socket of said second pair being detachably connected to a respective one of the sockets of said first pair and having an axial passage receiving one end portion of one of the two cables to be connected, wherein each socket of the second pair has a generally cylindrical outer shape and its axial passage is also cylindrical with a diameter corresponding to that of the end portion of the cable received therein, and each socket of the second pair is secured to the end portion of the corresponding cable by constricting said socket of said second pair through a constricting die, one of the two cylindrical sockets of said second pair being fixed to a bared end portion of the core of the largest cable.

2. The connection device as claimed in claim 1, wherein each of the two sockets of said first pair comprises and inwardly threaded cylindrical portion, and each of the two cylindrical sockets of said second pair comprises an externally threaded portion screwed into the threaded cylindrical portion of the corresponding socket of said first pair, and wherein the threaded portions of corresponding sockets of said first and second pairs of sockets comprise transverse bores which, when they are aligned, receive a pin.

3. The connection device as claimed in claim 1, wherein the sockets of said first pair have an outer diameter substantially equal to the outer diameter of the largest cable, and the cylindrical sockets of said second pair have, after constriction, an outer diameter comprised between the diameter of the core of the largest cable and the outer diameter thereof.

4. The connection device as claimed in claim 1, wherein the ends of the outer strands of the largest cable, on the connection side, are spaced longitudinally from the cylindrical socket fixed to the core of the largest cable, and a first ring is fixed by crimping to said core and to said ends of the outer strands, the first ring having, after crimping, an outer diameter substantially equal to the outer diameter of the largest cable.

5. The connection device as claimed in claim 4, wherein at least a second ring having an outer diameter substantially equal to the outer diameter of the largest cable is disposed on the core thereof between the first ring and the cylindrical socket.

6. The connection device as claimed in claim 4, wherein at last one sleeve made from an elastomer material, having an outer diameter substantially equal to the outer diameter of the largest cable is disposed on the core thereof between the first ring and said cylindrical socket.

7. The connection device as claimed in claim 1, wherein a plurality of rings are disposed on the smallest cable at intervals from each other and from the cylindrical socket fixed to the smallest cable, said other rings having outer diameters which become smaller and smaller the further away from the connection, the ring the nearest to the connection having an outer diameter substantially equal to that of the cylindrical socket after constriction thereof.

8. The connection device as claimed in claim 7, wherein sleeves made from an elastomer material are disposed on the smallest cable between said rings and between the ring the nearest to said connection and the cylindrical socket fixed to the smallest cable.

* * * * *